Patented Dec. 30, 1952

2,623,834

UNITED STATES PATENT OFFICE 2,623,834

COLORING PROCESS FOR NYLON

Norman Andrew Armitage, Watford, and John Henderson, Manchester, England, assignors to Imperial Chemical Industries Limited, a corporation of Great Britain No Drawing. Application November 18, 1949, Serial No. 128,256. In Great Britain November 22, 1948

3 Claims. (Cl. 117—66)

This invention relates to a colouring process for nylon and more particularly to a process whereby nylon can be temporarily coloured.

For the purpose of identifying fibres, yarns, threads and the like which have particular properties, it is a common practice to treat such fibres, yarns, threads and the like with sighting colours, that is to say to apply fugitive tints which can be removed—usually by a simple scouring operation—after the fibres, yarns and threads have been used in weaving, knitting or other operations.

As sighting colours for nylon (polyamide) yarns and threads, it has hitherto been proposed to use certain dyestuffs, especially certain acid dyestuffs and certain basic dyestuffs. Such dyestuffs are in general satisfactory for use with nylon for many processes but when the material containing tinted nylon is subjected to treatments which involve the action of steam under pressure, a partial softening of the nylon occurs, and some dyestuff is absorbed by the nylon. This absorbed dyestuff cannot be removed by a simple scouring operation. If the dyestuff is chemically destroyed, the decomposition products cannot be completely removed from the nylon so that the nylon is discoloured.

We have now found that these difficulties can be obviated by using inorganic pigments instead of dyestuffs for the sighting colours. The pigments can be removed from the nylon by a simple scouring operation even when the nylon material has been subjected to pressure steaming processes.

The word "scouring" is used here in the sense used in the textile industry, that is to say by a scouring operation we mean a simple treatment of the textile materials in a warm solution of soap or other detergent, for example in 0.3% soap solution at 50–60° C., or the operation of running the textile material through a winch machine containing such a warm solution of soap or other detergent, and no drastic rubbing or boiling is implied.

According to our invention therefore, in a process for the manufacture of textile materials comprising nylon in the form of fibres, threads, yarns, or the like, we provide the steps which comprise applying one or more inorganic pigments as sighting colours to the nylon and then removing the pigments by a scouring operation at a subsequent stage in the process of manufacture.

In a particular embodiment of our invention the pigments are removed by a scouring operation at any stage subsequent to the treatment of the textile material with steam.

The pigment may be supplied to the surface of the nylon fibres, yarns or threads by simply treating the nylon with a dispersion of the pigment in water, preferably in the presence of a surface active agent, for example sodium oleate. Or the pigment in the form of a suspension in the presence of a surface active agent if desired, may be added to the warp size or knitting gum which is applied to the nylon and this forms a valuable feature of our invention. The quantity of pigment to be used will depend on the depth of shade required but in general quantities between about 0.5% and about 2% by weight of the warp size or knitting gum are suitable.

The surface active agent assists in maintaining the pigment particles in suspension during use.

As examples of suitable pigments for use in the process of our invention, there may be mentioned Prussian Blue (Colour Index No. 1288), barium chromate pigments (Color Index No. 1269), zinc chromate pigments (Colour Index No. 1271), lead chromates and basic lead chromates (Colour Index Nos. 1270 and 1279), molybdenum-containing lead chromate pigments, red and yellow iron oxide pigments (Colour Index Nos. 1267 and 1276), Brunswick Green, chrome oxide greens and chrome greens (Colour Index Nos. 1295, 1291 and 1298), cadmium yellow (Colour Index No. 1272), carbon black and manganese pigments. Particular brands of lead chromate pigment which may be used include Pure Scarlet Chrome MS and Pure Lemon Chrome 3GNS which are on the selling range of Imperial Chemical Industries Limited.

The pigment used should preferably be finely divided and free from gritty particles. It should not settle in the warp size or knitting gum used and it should not adversely affect the viscosity of the knitting gum.

By the process of our invention highly tinted yarns are obtained and the tints can be removed by a simple scouring process with soap or other dispersing agent even after the nylon has been submitted to a preboarding process or other steaming process such as for example on application of steam at 30 lbs. pressure for ½ hour.

The invention is illustrated but not limited by the following examples in which the goods are by weight.

Example 1

Polyhexamethylene adipate yarn in cone form is splashed with a suspension of ultramarine (Colour Index 1290) which is prepared by adding 1 part of ultramarine to a boiling solution of 1 part of sodium oleate in 50 parts of water, mixing thoroughly, cooling by the addition of 50 parts of cold water, and again mixing thoroughly.

Polyhexamethylene adipate yarn tinted in this manner is readily decolourised again (before or after subjection to a steaming process under pressure as used to set the twist) by treating in a solution containing 5 parts of soap per 1000 parts of water at 40–50° C.

*Example 2*

Nylon warp threads are passed through a warp sizing machine containing the usual size to which has been added 1% of Pure Scarlet Chrome MS in the form of a paste with an equal weight of a 20% solution of the condensation product of cetyl alcohol with 17 molecular proportions of ethylene oxide.

Nylon warp threads tinted in this manner are readily decolourised after weaving by treating them with a solution containing 5 parts of a 25% aqueous paste of sodium 4-oleylamino-1-methoxy-benzene-2-sulphonate per 1000 parts of water at 40–50° C. The sighting colour is readily removed even after the material has been steam set under pressure before scouring.

*Example 3*

Nylon knitting yarns are tinted yellow by incorporating in the knitting gum during bobbin-to-bobbin winding 1% of Pure Lemon Chrome 3GNS in the form of a paste with an equal weight of a 20% aqueous solution of the condensation product of cetyl alcohol with 17 molecular proportions of ethylene oxide.

The yarn is knitted and the material obtained is subjected to a steaming treatment under pressure to set with the formation of the loops. The colouring matter can then be removed easily by treating the material in a solution containing 5 parts of soap and 2 parts of soda ash per 1000 parts of water at 40–50° C.

*Example 4*

Nylon yarns are tinted a red shade by incorporating in the knitting gum during bobbin-to-bobbin winding 0.5% of Pure Scarlet Chrome MS in the form of a paste with an equal weight of a 10% solution of the sodium salt of the condensation product of formaldehyde with naphthalene sulphonic acid.

The yarn is knitted and the material obtained is subjected to a steaming treatment under pressure to set with the formation of the loops. The colouring matter can then be removed easily by treating the material in a solution containing 5 parts of soap in 1000 parts of water at 40°–50° C.

We claim:

1. A process for tinting nylon fibers, threads or yarns with fugitive colors wherein permanent discoloration of said nylon is prevented, which comprises treating said nylon with an aqueous suspension containing a fugitive color and a surface active agent, said color consisting of inorganic pigment, subjecting the nylon to a mechanical textile working process, setting the worked nylon by the action of steam under pressure under conditions such that some softening of the nylon may occur, and then removing said pigment by treating said nylon with an aqueous detergent solution.

2. A process as claimed in claim 1 wherein said suspended pigment is added to a textile sizing composition prior to its application to said nylon, said pigment being present in said sizing composition in amounts of about 0.5% to about 2% by weight of said sizing composition.

3. A process as claimed in claim 1 wherein said pigment comprises an aqueous suspension of about one part pigment to about one part sodium oleate and said nylon yarn is splashed with said pigment while in cone form.

NORMAN ANDREW ARMITAGE.
JOHN HENDERSON.

REFERENCES CITED

The following references are of record in the file of this patent:

UNITED STATES PATENTS

| Number | Name | Date |
|---|---|---|
| 1,840,291 | Platt et al. | Jan. 5, 1932 |
| 2,083,333 | Lawson | June 8, 1937 |
| 2,324,601 | Spanagel | July 20, 1943 |

OTHER REFERENCES

The Processing of Aralac & Other Protein Base Fiber—Millson, American Cyanamid Co., Calco Bulletin #667–1942 page 5.